United States Patent
Meisl et al.

(10) Patent No.: US 8,018,959 B2
(45) Date of Patent: Sep. 13, 2011

(54) SYSTEM AND METHOD FOR IMPLEMENTING A UNIVERSAL MESSAGING GATEWAY (UMG)

(75) Inventors: Armin Meisl, Munich (DE); Leila Fiouzi, Toronto (CA)

(73) Assignee: Redknee Inc., Mississauga (CA)

( * ) Notice: Subject to any disclaimer, the term of this patent is extended or adjusted under 35 U.S.C. 154(b) by 0 days.

(21) Appl. No.: 12/765,388

(22) Filed: Apr. 22, 2010

(65) Prior Publication Data

US 2010/0203910 A1    Aug. 12, 2010

Related U.S. Application Data

(63) Continuation of application No. 12/242,040, filed on Sep. 30, 2008, now Pat. No. 7,733,887, which is a continuation of application No. 10/671,798, filed on Sep. 29, 2003, now Pat. No. 7,447,219.

(51) Int. Cl.
 *H04L 12/56* (2006.01)
 *H04J 1/16* (2006.01)
(52) U.S. Cl. .......... 370/401; 370/329; 370/467
(58) Field of Classification Search .......... 370/329, 370/401, 467
See application file for complete search history.

(56) References Cited

U.S. PATENT DOCUMENTS

| | | |
|---|---|---|
| 6,178,331 B1 | 1/2001 | Holmes et al. |
| 6,493,558 B1 | 12/2002 | Bernhart et al. |
| 7,003,307 B1 | 2/2006 | Kupsh et al. |
| 7,127,264 B2 | 10/2006 | Hronek et al. |
| 7,272,662 B2 | 9/2007 | Chesnais et al. |
| 7,639,710 B1* | 12/2009 | Stine et al. .......... 370/463 |
| 2004/0053629 A1* | 3/2004 | Rueger et al. .......... 455/466 |
| 2004/0259531 A1 | 12/2004 | Wood et al. |
| 2008/0159206 A1* | 7/2008 | Smith et al. .......... 370/328 |

FOREIGN PATENT DOCUMENTS

EP       1145577 B1    1/2004

* cited by examiner

*Primary Examiner* — John Pezzlo
(74) *Attorney, Agent, or Firm* — Gardner, Linn, Burkhart & Flory, LLP

(57) ABSTRACT

The system and method for implementing a Universal Messaging Gateway (UMG) disclosed herewith provides telecommunications Network Operators (NO) and like related parties with innovative and flexible art for delivering domestic and foreign network originated Multi-media traffic and/or, more generally, interactive and/or synchronous mobile text and related telecommunications messaging or information services to a large number of related receiving telecommunications network equipment (as ESMEs and/or SMS-Cs in relation to SMS traffic).

13 Claims, 1 Drawing Sheet

SYSTEM AND METHOD FOR IMPLEMENTING A UNIVERSAL MESSAGING GATEWAY (UMG)

RELATED APPLICATIONS

This is a continuation of U.S. patent application Ser. No. 12/242,040, filed Sep. 30, 2008 (allowed) which is a continuation of U.S. patent application Ser. No. 10/671,798, filed Sep. 29, 2003 now U.S. Pat. No. 7,447,219, issued Nov. 4, 2008. The contents of all of these related applications are incorporated herein by reference in their entirety.

BACKGROUND ART

Interactive mobile text and related services (including Short Message Service (SMS) and Multi-Media Services (MMS)), which facilitate such art as voting, gaming, information products, and real-time messaging continue to evolve in their popularity and ubiquity among network operators and mobile subscribers alike. The services provide for interactive and/or synchronous entertainment and commercial activities, as with real-time quiz shows, questionnaires, polls and related events. Indeed, owing to the growth, popularity and utility of such applications, telecommunications Network Operators (NO), marketers, and like interested parties seeks to build upon and capitalize such success by adding more applications and reaching more subscribers.

Nonetheless the prior art has neither demonstrated nor intimated an evolution of its teachings in this regard. Indeed, consider U.S. Pat. No. 6,178,331 to Holmes, et al. entitled System and process for allowing wireless messaging, and U.S. Pat. No. 6,493,558 to Bernhart, et al. entitled TD-SMS messaging gateway which both delimit art pertaining to SMTP Gateways and like systems, and indeed, unlike the system and method for implementing a Universal Messaging Gateway (UMG) of present, is only intended to serve subscribers of the home network and thereby does not include capability/ities of our invention to provide gateway service to GSM foreign subscribers and like users.

At a more generic level, U.S. patent application Ser. No. 20020087704 by Chesnais, et al. entitled Systems and methods for routing messages to communications devices over a communications network details a gateway system for performing protocol conversions. The art relating to our invention disclosed herewith however, exceeds such teachings, by inter alia, providing methods and systems for receiving Short Message Service (SMS), Multi-Media Service (MMS) and the like from foreign SMSCs, MMSCs and the like and routing them to the relevant home network and/or content providers.

REFERENCES CITED

U.S. patent application Ser. No. 20020087704 July, 2002 Chesnais, et al. 709/228
U.S. Pat. No. 6,178,331 January, 2001 Holmes, et al. 455/466
U.S. Pat. No. 6,493,558 December, 2002 Bernhart, et al. 455/466

TECHNICAL FIELD

The present invention relates generally to wireless communications and gateway services; and more specifically, to a system and method for implementing a Universal Messaging Gateway (UMG).

SUMMARY OF THE INVENTION

In the preferred embodiment, the system and method for implementing a Universal Messaging Gateway (UMG) disclosed herewith provides telecommunications Network Operators (NO) and like related parties with innovative and flexible art for delivering domestic and foreign network originated Multi-Media traffic and/or, more generally, interactive and/or synchronous mobile text and related telecommunications messaging or information services to a large number of related receiving telecommunications network equipment (as ESMEs and/or SMS-Cs in relation to SMS traffic).

In keeping with much of the background art, literature, leanings and teachings of the field, in introducing and launching interactive and/or synchronous mobile text and related telecommunications messaging or information services, including in this instance for the purposes of illustration, SMS applications, Application Service Providers (ASPs) must engage and interconnect with multiple service providers. From the ASPs' perspective, integrating with mobile networks remains a costly and labourious task, as traditional implementations have required the deployment of transmission facilities to each Network Operator's (NO) Short Message Service Center (SMS-C) (in this instance). Furthermore, operators will typically assign dissimilar short-codes or like mechanical/logical instructions for a given application, thereby creating confusion when wireless subscribers roam between carriers and geographic regions, and indeed dilutes the overall value of the service.

Thereby it is an aspect of the present invention to enable and provide a reply path for foreign subscribers to send interactive and/or synchronous mobile text and related telecommunications messaging or information services, including in this instance for the purposes of illustration, SMS messages to a given NO's Short Message service providers. In one embodiment therefore, the method, system and architecture addresses the need to provide a mechanism for routing mobile terminated SMS messages from the SS7 network (in this instance) to the connected ESMEs via, in this instance for the purposes of illustration, a Short Message Peer to Peer (SMPP) protocol. In another aspect, in relation to the delivery of Short Messages (SM), connection to multiple SMSCs is also articulated and provided for when routing SMPP traffic (in this instance) from SMSCs to ESMEs.

In elucidating the art further, the invention thus provides ASPs a single point of access to a given NO. The computer program product which implements the system and method for implementing a Universal Messaging Gateway (UMG) redirects and terminates traffic to a virtual mobile station address, then delivers the traffic to the appropriate ASP. The virtual mobile station address can be communicated to all subscribers in a given region, and can also deliver the SMS and/or other such related Multi-Media traffic to a subscriber irrespective of their roaming state. Any mobile subscriber world-wide has the ability to respond to an advertisement through a universal destination number assigned for the corresponding application.

A security and network management algorithm has been developed which, in alternate embodiments, when articulated with the system and method for implementing a Universal Messaging Gateway (UMG) (which exists as part of a computer program product) provides mechanisms for the blocking of unauthorized messaging, multi-media and other informational traffic from entering a given mobile network.

Management and administrative functions for the disclosed invention may be achieved through a single graphical user interface (GUI). Said interface allows for the configuration, connection, and disconnection of SMPP and/or like protocols and/or like logical connections. Practitioners skilled in the art will recognize that the invention remains wholly scaleable as needs and capacity requirements require.

DETAILED DESCRIPTION OF THE PREFERRED EMBODIMENTS

Figure 1:
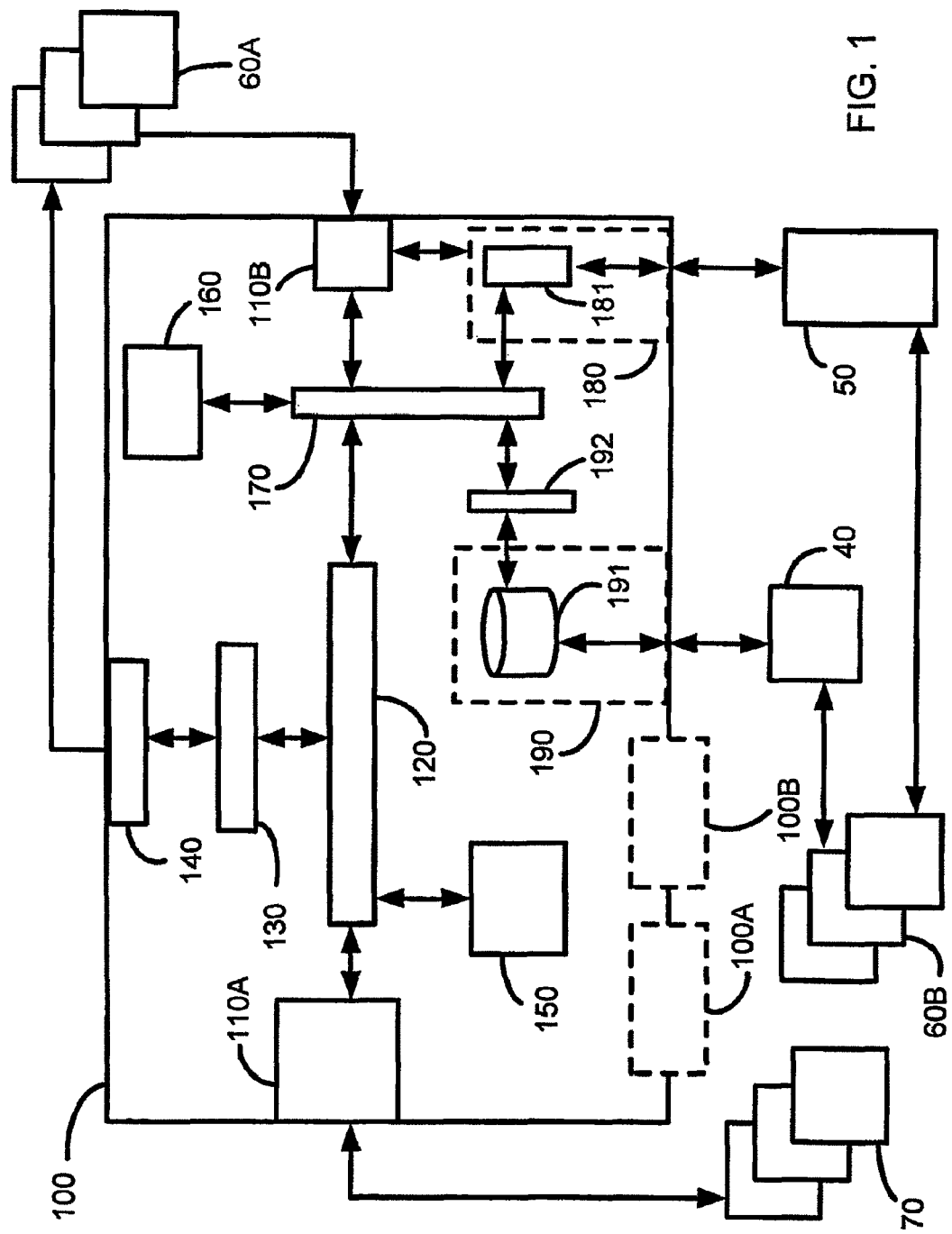
FIG. 1 illustrates a typical, non-limiting embodiment of the system level architecture employed in the disclosure of present.

Members skilled in the art will recognize that the ensuing represents an illustrative recital of the preferred embodiments of the invention of present and other embodiments may be articulated, gleaned and articulated from such while still remaining with in its spirit and scope. Indeed, equivalents found within the state of the art, and those which may reasonably and effectively be deemed equivalent in the future should also be understood as being incorporated by reference hereto and such. Furthermore, much of the language has been illustrative and is to be construed as expressly for pedagogical purposes in helping elucidate the art as concisely and beneficially as practical.

With reference now to FIG. 1, the system and method for implementing a Universal Messaging Gateway (UMG) 100, which exists as part of a computer program product can be functionally divided for the purposes of illustration among the following elements. Receiver Managers (110A, 110B), which for instance, manage and maintain External Short Message Entity (ESME) 70 connections (110A), Short Message Service Center (SMSC) 60A connections and other such connections in keeping with the state of the art. Specifically in relation to short message service (SMS), an SMSC Transmitter Manager 140, via the internally articulated SMS Reply Server 130, manages and maintains SMSC (60A) connections from the computer program product 100 to the relevant SMSC(s) 60A. A normalization engine 170 performs address normalizations within the invention. A routing engine 120 allows for automatic routing of messages delivered over Short Message Peer-to-Peer (SMPP) protocol receiver connections (although those skilled in the art will recognize that there are a variety of protocols which serve similar technical and mechanical purposes and ends which may be employed without diluting the intent and scope of the invention of present). The Home Location Register (HLR) module 190 of the invention 100, provides HLR 40 functionality to the GSM network (internally articulated with an HLR lookup database 191). Furthermore, the Mobile Switching Center (MSC) module 180 translates (181), co-ordinates and manages the protocol connections and like logical commands and overall MSC 50 functionality to the GSM network. Modules 180 and 190 handle much of the SMS traffic (in this instance) from foreign SMSCs 60B. Internal to the art of the computer program product which implements the system and method for implementing a Universal Messaging Gateway (UMG) 100, remains common, generic logging and network management elements 150, which are responsible for system logs, event records (ED), Simple Network Management Protocol (SNMP) based network management (of course, practitioners skilled in the art will recognize that other protocols may be employed and managed accordingly without necessarily diluting the scope and intent herewith). Residual elements of the invention 100, include a web-based or other suitably articulated provisioning interface 100B and a generic, multi-faceted interface for receiving protocols, connections and other like logical commands from various other networks and/or network elements as the art evolves 100A.

Continuing with reference to FIG. 1, the invention's 100 SMSC Receiver Manager 110B is responsible for SMPP receiver bind connections to the relevant SMSC(s) (60A, 60B) and the invention's articulated MSC Module 180 (for foreign SMSC(s)). SMSC Receiver connections connect from the invention to receive messages from an operator's SMSC(s) (60A, 60B). The computer program product which implements the system and method for implementing a Universal Messaging Gateway (UMG) 100 manages and controls SMSC connections, providing connection management services and consolidates SMPP data flows. Practitioners skilled in the art will recognize that exist a variety of protocols which serve similar technical and mechanical purposes and ends which may be employed without diluting the intent and scope of the invention of present. Likewise, members skilled in the art will recognize that the instruction provided herewith need not be limited to Short Messages (SM) and their related technologies and the limitations of the description serve only for the purposes of illustration and simplicity of purpose.

In elucidating the art relating to the SMSC Receiver Manager 110B further, consider that in the preferred embodiment, an SMPP Receiver link to a SMSC must be established before messages can be received from it. Also in the preferred embodiment, the computer program product which implements the invention establishes all SMPP connections to SMSC(s) upon startup. (In alternate embodiment, the art may also be manipulated as to disable this auto connection feature). The SMSC Receiver Manager supports connections to multiple SMSCs. Where multiple connections to the same SMSC account need to be established, the art and logic has been articulated such that multiple SMSC profiles with the same login parameters can be created. Once the said connection is established, the SMSC Receiver Manager Module will accept all incoming deliver_sm messages from the SMSC. In the preferred embodiment, all other SMPP PDU operations (except Enquire Links) will be rejected.

In alternate embodiments, the computer program product which implements the system and method for implementing a Universal Messaging Gateway (UMG) can maintain and ensure the status of a SMPP receiver connection by sending enquire link messages to the connected SMSC. The connected SMSC is to respond with a enquire link response message, indicating the connection is available. Incoming enquire links will be answered with an enquire link response message. Where the connected SMSC does not respond to a enquire link message, the art of the invention has been articulate to send an unbind message to the connected SMSC, and the connection is terminated.

In advancing the connection management functionality of the invention, the invention throttles incoming SMPP receiver links in order to prevent the excessive utilization of network elements by external entities. In an SMSC Receiver bind, only the numbers of messages defined by the throttling parameter (e.g. messages/second or other such configurable timeframe) configured in the SMSC Receiver profile are allowed. Subsequent messages are rejected with a configurable error code.

Continuing with reference to FIG. 1, the invention's 100 normalization and filter engine(s) 170 provide for flexible address normalization and blocking capabilities. One of the unique features of the invention delimits art which enables the network operator (or like) to block incoming traffic based on the service centre that the message was sent from. (Although in light of the state of the art, this feature does not apply to messages received from the SMSCs over the SMPP connections). In alternate embodiments, the invention may also enable the network operator to block incoming traffic based on the origination address of the message. Prefix matching on the origination address is supported. Messages that are originated from the blacklisted originators are rejected. If the message is blocked, the computer program product which implements the system and method for implementing a Universal Messaging Gateway (UMG) 100 returns a configurable error code.

Now, the Routing Engine 120 of the invention allows the telecommunications carrier (or like entity) to define flexible message routing for forwarding messages to ESME(s). In view of the importance of the art, the following considerations remain instrumental (though merely illustrative and non-limiting as practitioners skilled in the art will recognize) when defining the relevant logic as they pertain to said routing rules:

1. Rules are considered in priority order. Priority is not necessarily unique; in alternate embodiment, time of creation may be used as a tiebreaker value. In alternate embodiment, higher priority will be given to the older rule when there are multiple rules having the same priority.

2. In the preferred embodiment, the first rule that matches will be used and all other rules will be ignored. (In alternate embodiments, variations on this theme may be enjoyed and practiced).

3. Where no rules match, the message will be rejected; with configurable error code.

4. Once the Destination ESME ill is identified, the message will be routed to the Destination ESME. If the ESME has established multiple connections with more than one node under a cluster configuration, the message will be routed via the closest connection (i.e. on the same node, if connection exists). When more than one ESME connections is established on a node, messages will be delivered to ESME using round-robin.

Furthermore, non-limiting, illustrative examples of routing parameters supported by the computer program product which implements the invention (and therefore, by implication, the routing rules), include, incoming SMSC Connection ID, termination TONfNPI/MSISDN, origination TONfNPI/MSISDN, protocol ill, data coding scheme, and SMSC Address.

Still with reference to FIG. 1, the inventions' 100 ESME Receiver Manager IIOA is responsible for handling SMPP receiver bind connections from the ESME(s) 70. ESME 70 initiate SMPP receiver bind to connect to the invention 100 to receive messages. The computer program product 100 manages and controls ESME connections, providing connection management services and consolidates SMPP data flows. Practitioners skilled in the art will recognize that other protocols may be employed and managed accordingly without necessarily diluting the scope and intent herewith.

Said ESME Receiver Manager 110A provides overall connection management functionality including, authentication, connection monitoring and message buffering.

In order to receive messages, the ESME partner 70 must first establish a receiver bind connection to the invention 100. Each ESME partner 70 that connects to said invention 100 must be provisioned with a respective ESME Receiver profile, The invention 100 authenticates each ESME bind receiver request. For the purposes of illustration, in maintaining the security and integrating of communications, the following parameters are ordinarily verified, in the preferred embodiment, before accepting the bind request:

1. System Type, System ID, Interface Version, and Password supplied in the bind receiver request all must match a provisioned ESME Receiver Profile;

2. ESME Receiver Profile must be in a Enabled state;

3. The number of bound in ESME Receivers must be less than the configured "Maximum Number of Connections" parameter in the ESME profile Should the request fail any of the above verification parameters, the bind receiver request is rejected with a configurable SMPP error code. In alternate embodiments, a SNMP trap can be sent. Of course, where the ESME bind receiver request is accepted, the ESME 70 is permitted to receive SMPP messages from the invention 100.

The ESME Receiver Manager 11OA monitors and maintains the SMPP connection with the connected ESME(s). It is also responsible to provide ESME Lookup Server 192 with the status of each ESME 70.

In alternate embodiments, the invention 100 can maintain and ensure the status of a SMPP receiver connection by sending enquire link messages in configurable time intervals to the connected ESME 70. The connected ESME 70 is to respond with a enquire link response message, indicating the connection is available. Incoming enquire links will be answered with an enquire link response message. If the connected ESME 70 does not respond to a enquire link message, the invention 100 sends a unbind message to the connected ESME 70, and the connection is terminated. Practitioners skilled in the art will recognize that other protocols may be employed and managed accordingly without necessarily diluting the scope and intent herewith.

The logic of the invention 100 has been articulated to throttle outgoing SMPP receiver links in order to prevent excessive traffic from being sent to external entities. In an ESME Receiver bind, only the numbers of messages defined by the throttling parameter (in messages/second or other such parameter) configured in the ESME Receiver profile are allowed. Subsequent messages are stored in the buffer (where configured) or rejected with a configurable logical error code.

The ESME Receiver Manager 110A supports multiple message handling and buffering configurations. Illustratively, such configurations include, Non-Buffered Mode, Circular Buffered Mode and Fixed Buffered Mode. For all buffering modes, Deliver_SM messages will be delivered to the destination ESME 70 immediately if connection is available. The Deliver_SM response received from the ESME 70 will be relayed back to the originating SMSC 60A or the invention's 100 MSC Module 180. In cases where the ESME 70 does not respond within the configurable timeout period, a Deliver_SM response with configurable error code (default ESME_RDELIVERYFAILURE) will be returned. In continuing with the illustrative embodiments, in Non-Buffered Mode, if there is no connection established to the destination ESME, messages will be rejected immediately with configurable error code (default ESME_RX_T_APPN). In Circular Buffered Mode, if there is no ESME connection or throttle exceeded, messages will be stored in the circular buffer and positively acknowledged. When the buffer is full, the new message will overwrite the oldest one. When the connection is reestablished, the messages will be delivered from the buffer immediately to the ESME 70. Before the buffer gets cleared, new incoming messages will be stored in the buffer (and positively acknowledged). Once the buffer is cleared, new incoming messages will be delivered to the ESME directly. In Fixed Buffered Mode, if there is no ESME connection or throttle exceeded, messages will be stored in the fixed size buffer and positively acknowledged. When the buffer is full, the new message will be rejected with configurable error code (default ESME_RMSGQFUL). When the connection is re-established, the messages will be delivered from the buffer immediately to the ESME 70. Before the buffer gets cleared, new incoming messages will be stored in the buffer (and positively acknowledged if buffer is available). Once the buffer is cleared, new incoming messages will be delivered to the ESME 70 directly.

The invention's 100 Reply-SMS Server 130 supports the generation of response messages to confirm the originating subscribers that message get delivered successfully. A Reply-SMS message will be generated only where this feature has been articulated and enabled in the destination ESME profile and the message get successfully delivered to the ESME 70. Reply-SMS messages will be sent as SMPP Submit_SM messages to the connected SMSC(s) 60A via the SMSC Transmitter Manager 140. The greeting message to be sent is configurable on a per ESME 70 basis.

Continuing with reference to FIG. 1, the inventions' 100 SMSC Transmitter Manager 140 is responsible for SMPP transmitter connections to the SMSC(s) 60A and the invention's 100 MSC Module 180. The SMSC Transmitter Manager 140 provides Connection management functionality as, establishing connections, and connection monitoring. In establishing connections, the invention's 100 SMSC Transmitter Manager 140 initiates SMPP Transmitter connections to configured SMSC(s) 60A. An SMPP Transmitter link to an SMSC 60A must be established before messages can be sent to it. The, the computer program product which implements the system and method for implementing a Universal Messaging Gateway (UMG) 100 establishes all SMPP connections to SMSC(s) 60A upon startup. Configuration is also supported to disable this auto connection feature. In addition, in alternate embodiments, a GUI interface provides capabilities to disconnect and re-connect any SMPP connection. The SMSC Transmitter Manager 140 supports connections to multiple SMSCs 60A. If multiple connections to the same SMSC account need to be established, multiple SMSC profiles with the same login parameters can be created. In connection monitoring, the SMSC Transmitter Manager 140 monitors and maintains the SMPP connection with the connected SMSC(s) 60A. In alternate embodiments, the, the computer program product which implements the system and method for implementing a Universal Messaging Gateway (UMG) 100 can maintain and ensure the status of a SMPP transmitter connection by sending enquire link messages to the connected SMSC 60A. The connected SMSC 60A is to respond with a enquire link response message, indicating the connection is available. Incoming enquire links will be answered with an enquire link response message. If the connected SMSC 60A does not respond to a enquire link message, the, the computer program product which implements the system and method for implementing a Universal Messaging Gateway (UMG) 100 sends a unbind message to the connected SMSC 60A, and the connection is terminated. The invention 100 will try to re-establish the connection if Auto Start is configured to True (or other such configurable parameter).

The invention's 100 ESME Lookup Server 192 provides a CORBA interface for ESME status lookup (although those skilled in the art will recognize that there are a variety of protocols which serve similar technical and mechanical purposes and ends which may be employed without diluting the intent and scope of the invention of present). The invention's 100 HLR Module 190 sends requests to ESME Lookup Server to query the status of the ESME 70.

What is claimed is:

1. A middleware platform system comprising:
at least one application service provider;
at least one message delivery element;
a universal message gateway including a first common interface for connecting to said at least one application service provider and a second common interface for connecting to said at least one message delivery element;
said universal message gateway further including a mobile switching center module; said mobile switching center module configured to receive message service traffic from said at least one message delivery element; and
a routing engine coupled between said first common interface and the mobile switching centre module, said routing engine configured to implement at least one routing rule based on at least one routing parameter;
said universal message gateway being configured to direct said message service traffic to a virtual mobile station address associated with said at least one application service provider, wherein one or more of said at least one message delivery element sends network originated telecommunications messaging traffic to said universal message gateway.

2. The system of claim 1, wherein the message delivery element is a short message service center (SMSC).

3. The system of claim 2, comprising a plurality of SMSCs wherein at least two of said SMSCs are disparate in design.

4. The system of claim 1 wherein the message delivery element is an multi-media message service center (MMSC).

5. The system of claim 4 comprising a plurality of MMSCs wherein at least two of said MMSCs are disparate in design.

6. The system of claim 1 wherein said universal message gateway further comprises an home location register module; said home location register module configured to receive message service traffic from said at least one message delivery element.

7. The system of claim 1, where said first common interface includes a first receiver manager which interacts with said at least one application service provider, and said second common interface includes a second receiver manager which interacts with said at least one message delivery element.

8. The system of claim 1, where telecommunications messaging traffic includes at least one of Multi-Media traffic, interactive and/or synchronous mobile text, and short message service traffic.

9. The system of claim 1, wherein said application service provider is associated with an ESME.

10. The system of claim 9 wherein said routing engine is configured to route said telecommunications messaging traffic is routed to said at least one ESME within at least one of parameter selected from the group consisting of SMSC Connection ID, Termination TON/NPI/MSISDN, Origination TON/NPI/MSISDN, protocol ID, data coding scheme, and SMSC address.

11. The universal message gateway of claim 1 wherein said first common interface is based on the short message peer to peer (SMPP) protocol.

12. The universal message gateway of claim 1 wherein said universal message gateway is further configured to perform at least one of a throttling function, a queuing function, and a buffering function.

13. The universal message gateway of claim 11 further comprising an SMS reply server configured to generate a response message to confirm a successful delivery of a message to said at least one ESME.

* * * * *